US011974119B2

(12) United States Patent
Therene et al.

(10) Patent No.: US 11,974,119 B2
(45) Date of Patent: Apr. 30, 2024

(54) DEVICE AND PROCESS FOR PROCESSING A MESSAGE AND SENDING A LPWAN MESSAGE

(71) Applicant: IDEMIA IDENTITY & SECURITY FRANCE, Courbevoie (FR)

(72) Inventors: Eric Therene, Courbevoie (FR); Sébastien Nerot, Courbevoie (FR); Anthony Fonteneau, Courbevoie (FR)

(*) Notice: Subject to any disclaimer, the term of this patent is extended or adjusted under 35 U.S.C. 154(b) by 234 days.

(21) Appl. No.: 17/510,516

(22) Filed: Oct. 26, 2021

(65) Prior Publication Data

US 2022/0132305 A1 Apr. 28, 2022

(30) Foreign Application Priority Data

Oct. 28, 2020 (FR) ...................................... 20 11057

(51) Int. Cl.
*H04W 12/033* (2021.01)
*H04W 12/041* (2021.01)
*H04W 12/06* (2021.01)

(52) U.S. Cl.
CPC ....... *H04W 12/033* (2021.01); *H04W 12/041* (2021.01); *H04W 12/06* (2013.01)

(58) Field of Classification Search
CPC ..... H04W 76/19; H04W 72/12; H04W 72/04; H04W 40/22; H04J 3/0661; H04J 3/0688; H04L 12/721; H04L 29/08
See application file for complete search history.

(56) References Cited

U.S. PATENT DOCUMENTS

| 2013/0202111 A1 | 8/2013 | El Gamal |
| 2018/0089434 A1* | 3/2018 | Sibert ................. H04L 63/0853 |
| 2018/0181337 A1* | 6/2018 | Durham .................. G06F 21/79 |
| 2019/0036708 A1* | 1/2019 | Fregly .................. H04L 61/302 |

FOREIGN PATENT DOCUMENTS

| EP | 3073752 B1 | 10/2017 |
| EP | 3262481 B1 | 11/2018 |

OTHER PUBLICATIONS

English language abstract of EP3073752.
Mcgrew Cisco Systems D et al Generation of Deterministic Initialization Vectors (IVs) and Nonces draft-mcgrew-iv-gen-00.txt Internet Engineering Task Force, IETF; Standardworkingdraft, Internet Society (ISOC) 4, Rue Des Falaises CH-1205 Geneva, Switzerland.
Migault Ericsson T Guggemos LMU Munich Y Nir Dell Technologies D: "Implicit Initialization Vector (IV) for Counter-Based Ciphers in Encapsulating Security Payload (ESP); rfc8750.txt" Internet Engineering Task Force, IETF; Standard, Internet Security (ISOC) 4, Rue Des, No.7 Mar. 11, 20202, pp. 1-5.

* cited by examiner

*Primary Examiner* — Iqbal Zaidi
(74) *Attorney, Agent, or Firm* — Cabinet Beau de Lomenie; Jonathan Bingham; Brian Gordaychik

(57) ABSTRACT

A process for processing a received message, where the message includes encrypted data and at least one indicator element, is disclosed. The process includes generating a complete indicator from data stored in the electronic device and from the received indicator element, generating a key from the complete indicator, and decrypting the encrypted data using said key. The disclosure also relates to a corresponding sending process.

16 Claims, 4 Drawing Sheets

[Fig. 1]
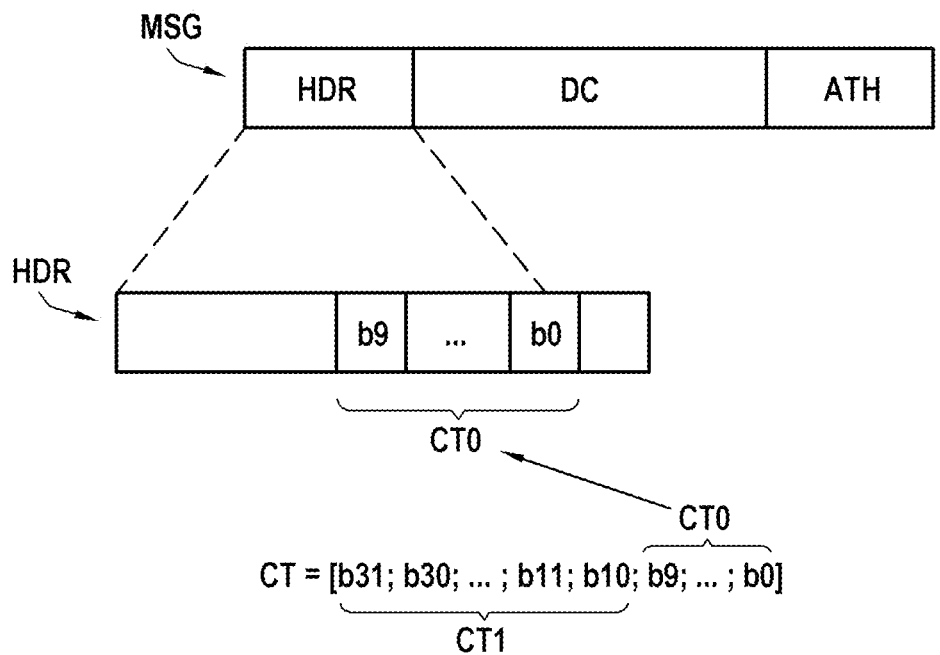
[Fig. 2]
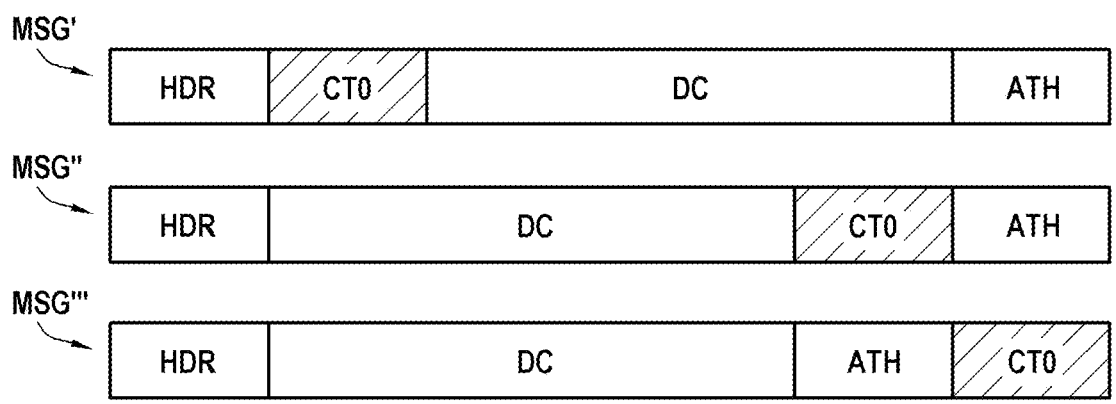

[Fig. 3]
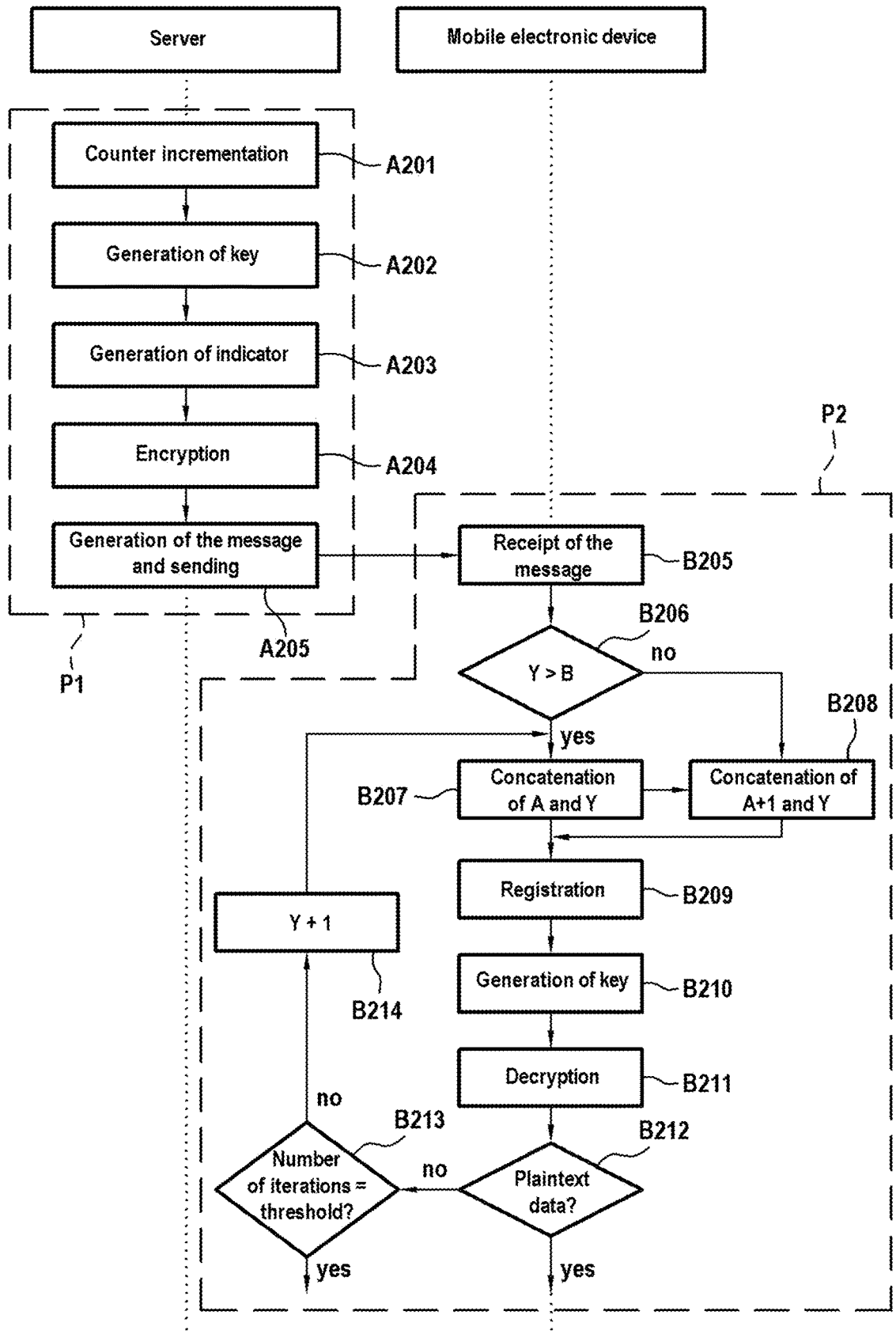

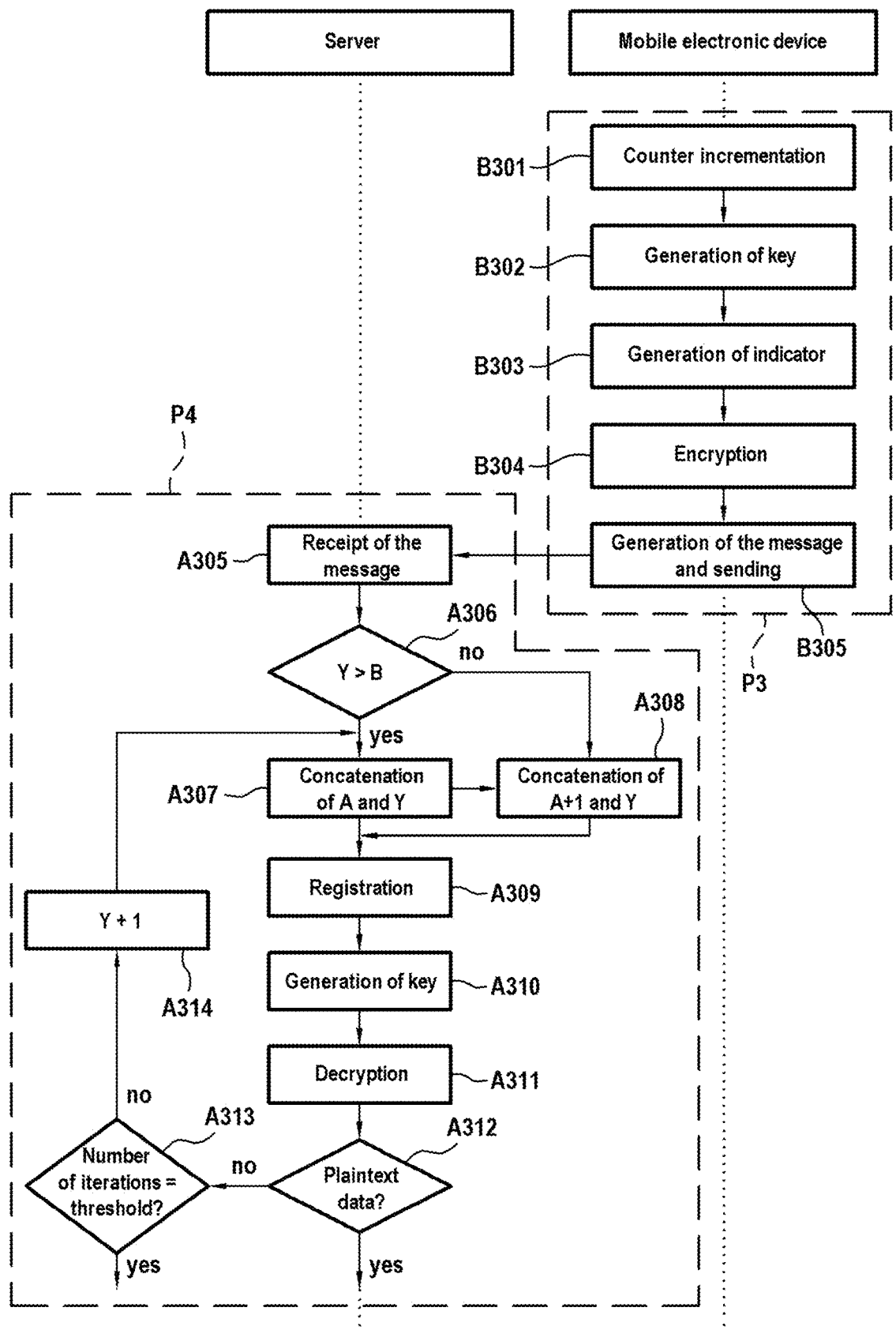
[Fig. 4]

[Fig. 5]
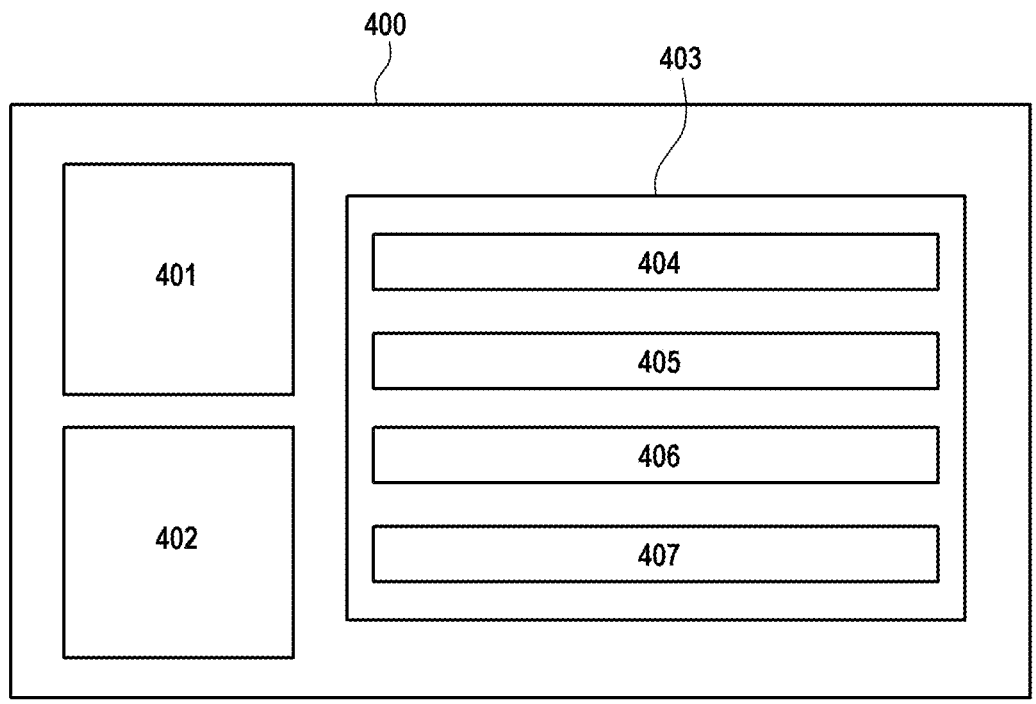
[Fig. 6]
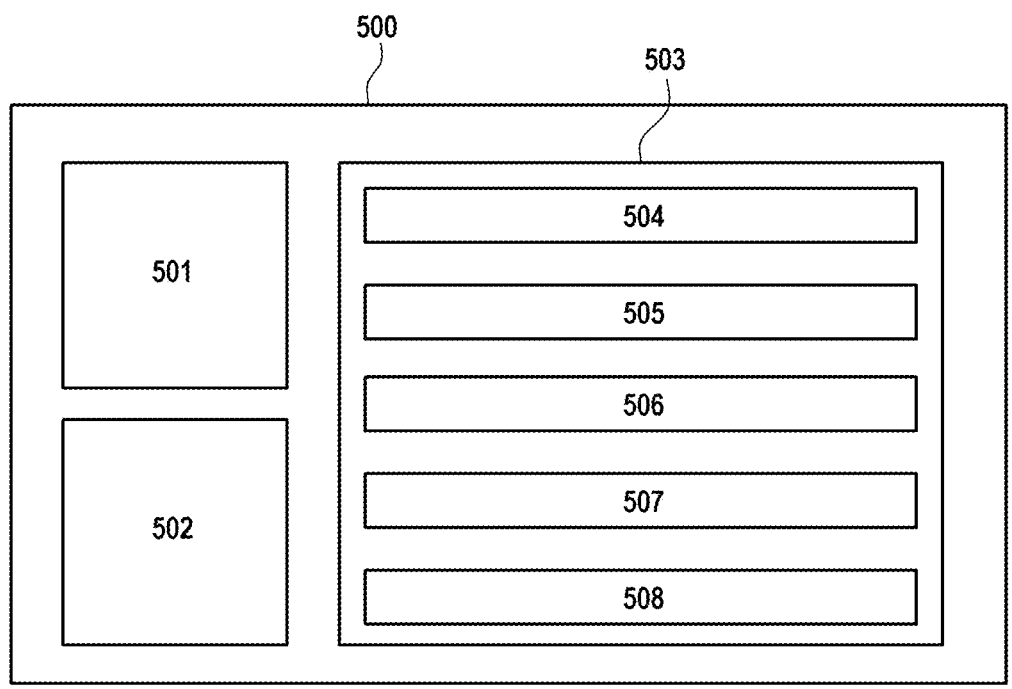

DEVICE AND PROCESS FOR PROCESSING A MESSAGE AND SENDING A LPWAN MESSAGE

TECHNICAL FIELD

The disclosure relates to the general field of communication between electronic devices and servers.

The disclosure applies in particular and in a non-limiting manner to the communication of messages via low-power wireless links. These links are generally designated by the acronym LPWAN (Low-Power Wide-Area Network).

BACKGROUND

Security mechanisms for exchanges between electronic devices and servers generally use prior exchanges of a quantity of information (random data, signed random data, etc.). This secures subsequent communications between a server and an electronic device via encryption based on keys.

In the context of 'the Internet of things' (IOT) and LPWAN communications, the available bandwidth is too low to permit these multiple exchanges of messages. For example, some devices can send just one message per day or a single message every hour.

In this context it is therefore very complicated to exchange messages which will allow subsequent safeguarding of communications: it is preferred to send useful information only to be communicated (typically commands).

Yet there is a considerable need for securing of communications between mobile electronic devices (for example devices of the Internet of things) and servers.

It has been proposed to use fixed keys stored on the server side and on the mobile electronic device side: this solution is unsatisfactory with respect to the security of exchanges. In fact, retrieving keys by an unauthorised third party compromises the safeguarding of these exchanges.

The present disclosure addresses some of these disadvantages, and in particular proposes securing communications between mobile electronic devices and servers by making the managing of keys dynamic and transient.

SUMMARY

The present disclosure responds to the above-described need by proposing a process for receiving a message executed by an electronic device, the message comprising encrypted data and at least one indicator element, the process comprising:
  generating a complete indicator from data stored in the electronic device and from the received indicator element,
  generating a key from at least the complete indicator, and decryption of said encrypted data using said key.

Therefore, the information which will be used to generate a key is placed directly in the message. This key is a decryption key.

Generating the key from the complete indicator can be a key derivation step known per se.

Also, the indicator element can be a portion of the complete indicator, for example a number of the bits of this complete indicator.

By way of alternative, the indicator element can be an element which obtains the complete indicator by application of a function. This function further uses the data stored in the electronic device.

The proposed process therefore secures communication of information by using the same message for this information and for the security information which will allow decryption of the message (this security information includes the indicator element).

It can be noted that the message can have a frame structure (for example compatible with a protocol or an existing standard) with one part comprising the encrypted data and another part comprising the indicator element.

Generation of the key is not limited to use of the single complete indicator and can comprise the use of other elements, for example an identifier (optionally of a secure element present inside the electronic device) of the electronic device or else the base vector of the electronic device for the authentication aspects (called seed).

According to a particular embodiment, the received indicator element is in an unencrypted portion of the message.

According to a particular embodiment, the received indicator element is in an unencrypted header of the received message.

The message headers cannot be encrypted and are therefore well adapted to contain the indicator element.

The skilled person can select the format of the message (for example the frame) so that this message comprises an unencrypted header adapted to receive the indicator element.

According to a particular embodiment, if the decryption does not deliver the encrypted decrypted plaintext data when the received indicator element is used, another indicator element value selected from a group of predetermined indicator element values is determined, and this selected value is used to implement the generation of the complete indicator.

This particular embodiment ensures that the encrypted data will be well decrypted. In fact, to the extent where the stored data are correct, it is possible to accept several possible values of indicator elements.

The skilled person can detect that the encrypted data have been validly decrypted and that they are plaintext. For instance, the encrypted data are plaintext if they are in an exploitable or expected format, optionally for subsequent processing.

According to a particular embodiment, the complete indicator is a counter of messages sent and received which can be registered on M+N bits, M and N being non-zero integers,
  the received indicator element being a number of N consecutive bits,
  the stored data comprising at least one number of M consecutive bits,
  the generation of the complete indicator comprising a binary concatenation of said number of M consecutive bits with said number of N consecutive bits, said number of N consecutive bits forming the low-weight bits of the complete indicator.

The use of a counter of sent and received messages monitors successive exchanges. Keys which are all associated with a respective message can be derived.

Transmitting just one number of N consecutive bits limits the quantity of information exchanged, and therefore preserves bandwidth.

This particular embodiment further lets the electronic device test a plurality of possibilities of indicator elements ($2^N-1$ possibilities) for generating the complete indicator.

In this way, this particular embodiment is particularly robust.

According to a particular embodiment, the group of predetermined indicator element values comprises the possible $2^N-1$ values which can be written to N bits.

The value of N could be selected to favour either the bandwidth or the security of the decryption.

According to a particular embodiment, the stored data comprise said number of M consecutive bits, indicating a value A, and a number of N consecutive bits, indicating a value B, said number of N consecutive bits of the received indicator element indicating a value Y, and in which if Y is strictly greater than B then the generation of the complete indicator comprises the binary concatenation of A and Y (that is, concatenation of M consecutive bits which indicate the value A with the N consecutive bits which indicate the value Y) and the storing of the resulting complete indicator (for example in binary form), if not, the generation of the complete indicator comprises the concatenation of A+1 and of Y.

Preferably, the counter is the same on both the sender side of the message and the electronic device side which receives the message.

This particular embodiment updates the counter for the electronic device.

It is evident that the aim of binary concatenation of values is to form a value by placing the bits of two values to be concatenated consecutively.

According to a particular embodiment, the resulting complete indicator is stored as new stored data.

Storing the resulting complete indicator as new stored data allows it to be reused for example for subsequent sending of a message or the processing of the next message to be received.

According to a particular embodiment, the process comprises the receipt of the message by a low-power wireless link.

For instance, the low-power wireless link can be a LPWAN link, for example of so-called 'Sigfox' type, from the name of the company on which the solutions are based on signal transmission using an ultra-narrow band (UNB), or else, for example of so-called LoRaWAN type (for 'Long Range Radio Wide Area Network') the transmission technology of which is based rather on a spectral signal spread of so-called LTE-M type (for 'Long Term Evolution for Machine') or else of so-called NB-IoT type (for 'Narrow-Band Internet of things').

These low-power wireless links are examples of long-range communications, at a rather low data rate, for which the process according to the disclosure is particularly well adapted, as it favours this low consumption and maintains a good security level.

But in no way is the disclosure limited to the low-power wireless links and can apply to any type of wireless link, for example those intended for short-range communications. Non-limiting examples here are WIFI links (for 'Wireless Fidelity'), Bluetooth, RFID (for 'Radio Frequency Identification'), ZigBee, NFC (for 'Near Field Communication').

Also, other types of wireless protocols such as for example GSM (for 'Global System for Mobile Communication'), LTE (for 'Long Term Evolution') or 5G (corresponding to the fifth generation of standards for mobile communications), or wired protocols can be used for receiving messages of the process such as defined above.

Since the process is independent relative to the transport bearers conveying the messages which are received in the process, it is therefore applicable to several types of standards or technologies, such as for example those cited above.

The disclosure also relates to a process for sending a message executed by an electronic device, the process comprising:

determining a complete indicator,
generating a key from at least the complete indicator,
generating an indicator element from the complete indicator, and
encrypting data using said key to obtain encrypted data,
wherein the message to be sent comprises said indicator element and said encrypted data.

The process can comprise sending the message to be sent.

In this process, a message which can be received is formulated by carrying out the process such as described above.

This process for sending can be configured to send messages compatible with all the process examples for processing a message such as described above.

According to a particular embodiment, the indicator element is placed in an unencrypted portion of the message to be sent.

According to a particular embodiment, the indicator element is placed in an unencrypted header of the message to be sent.

According to a particular embodiment, determination of the complete indicator comprises updating a complete indicator stored in the electronic device.

This particular embodiment ensures that the electronic device could process a message received later or even send a new message which could easily be decrypted by the device intended to receive this message.

According to a particular embodiment, the complete indicator is a counter of sent and received messages which can be registered on M+N bits, with M and N being non-zero integers, the complete indicator comprising, in the form of binary concatenation, a number of M consecutive bits and a number of N consecutive bits, said number of N consecutive bits forming the low-weight bits of the complete indicator and said indicator element.

According to a particular embodiment, the message is sent by a low-power wireless link.

The disclosure also proposes an electronic device for receiving a message comprising:

a module for receiving a message comprising encrypted data and at least one indicator element,
a module for generating a complete indicator from data stored in the electronic device and from the received indicator element,
a module for generating a key from at least the complete indicator, and
a module for decrypting said encrypted data.

This electronic device can be configured to execute all embodiments of the process for processing a message such as described above.

According to a particular embodiment, the electronic device comprises a server or a mobile electronic device.

The disclosure also proposes an electronic system for sending a message comprising:

a module for determining a complete indicator,
a module for generating a key from at least the complete indicator,
a module for generating an indicator element from the complete indicator,
a module for encrypting data using said key to obtain encrypted data, a module for generating the message to be sent, the message to be sent comprising said indicator element and said encrypted data, and a module for sending the message to be sent.

This electronic system can be configured to execute each of the embodiments of the process for sending such as described above.

According to a particular embodiment, the electronic system comprises a server and/or a mobile electronic device.

The mobile electronic device can be a device of the Internet of things, for example a water or electricity meter, a smartphone, a tablet, a smoke detector, a temperature or humidity sensor, a motion detector, industrial/travel trackers, a coffee machine, a refrigerator, a bracelet, door-opening/-closing detector, etc.

The server, well known to the skilled person, can be a device for providing and/or requesting information and/or providing and/or requesting services within a network, for example an application server or else a data server, within a network, for example, computer network, radio telecommunications network, network of the Internet of things.

The electronic system can therefore comprise a set of objects having the capacity to be connected together and/or to a network or networks, to capture and/or measure and/or store and/or send and/or receive data to and/or from other objects and/or servers.

The disclosure also proposes a computer program comprising instructions for executing steps of a process for receiving a message such as defined above when said program is executed by a computer.

The disclosure also proposes a computer program comprising instructions for executing steps of a process for sending a message such as defined above when said program is executed by a computer.

It should be noted that the computer program mentioned in the present explanation can use any programming language and be in the form of source code, object code, or intermediate code between source code and object code, such as in a partially compiled form, or in any other preferable form.

The disclosure also proposes a computer readable recording medium on which is recorded a computer program comprising instructions for executing steps of a process for processing a message such as defined above.

The disclosure also proposes a computer readable recording medium on which is recorded a computer program comprising instructions for executing steps of a sending process such as defined above.

The recording media (or data carriers) mentioned in the present explanation can be any entity or device capable of storing the program. For instance, the medium can comprise storage means such as a ROM, for example a CD ROM or a microelectronic circuit ROM, or even magnetic recording means, for example a diskette (floppy disc) or a hard drive.

On the other hand, recording media can correspond to a transmissible medium such as an electrical or optical signal which can be conveyed via an electrical or optical cable, via radio or by other means. The program according to the disclosure can in particular be downloaded over a network of Internet type.

Alternatively, recording media can correspond to an integrated circuit in which the program is incorporated, the circuit being adapted to execute or to be used in the execution of the process in question.

BRIEF DESCRIPTION OF THE DRAWINGS

Other characteristics and advantages of the present disclosure will emerge from the following description given in reference to the appended drawings which illustrate an example devoid of all limiting character, in which:

FIG. 1 illustrates an example of a message according to the present disclosure.

FIG. 2 illustrates other examples of messages according to the present disclosure.

FIG. 3 illustrates the sending of a message by a server and its receipt by a mobile electronic device.

FIG. 4 illustrates the sending by a mobile electronic device of a message and its receipt by a server.

FIG. 5 illustrates an electronic device for receiving a message.

FIG. 6 illustrates an electronic device for sending a message.

DETAILED DESCRIPTION

An exemplary embodiment of the disclosure will now be described in which a complete indicator of counter type is used.

It should be noted that the disclosure applies to any complete indicator. In other words it applies to any value which can be formulated from an indicator element, an indicator element which can be a value which occupies memory space less than that of the complete indicator, typically which occupies a smaller number of bits.

FIG. 1 shows the structure of a message MSG. This structure can be designated by the skilled person as a frame. This frame can be a frame such as defined in the LoRaWAN, LTE-M, NB-IoT standards or else in the frames such as formatted for the 'Sigfox' network.

In particular, the frame of the message MSG is a frame of a standard enabling communication by a low-power wireless link (LPWAN).

The message MSG comprises a header HDR, encrypted data DC (traditionally designated by payload), and an identification code ATH (for example a message authentication code, MAC).

The header contains information relative to the protocol in use, information relative to the communications channel in use and other information. In particular, the header contains an indicator element CT0. The indicator element CT0 comprises the lowest-weight bits of a counter CT which can be written to 32 bits with its 22 heaviest-weight bits D31 to D10 (portion noted CT1), and its 10 lowest-weight bits B9 to B0 (portion noted CT0).

It is accordingly understood that there are 1024 possible values for the indicator element CT0. Knowing the heaviest-weight portion CT1 of the counter CT is therefore necessary to be able to easily determine the value of the complete counter CT, or optionally by trying the 1024 possibilities for the indicator element CT.

It is also noted that the indicator element CT0 alone does not easily determine the value of the counter CT.

In variant embodiments illustrated in FIG. 2 which shows messages MSG', MSG'', and MSG''', the indicator element CT0 is placed in these figures in different placements within the message, apart from the header and apart from the encrypted portion of the message.

In fact, the indicator element CT0 is preferably placed in an unencrypted portion of the message.

FIG. 3 shows a first process P1 for sending a message, and a second process P2 for receiving the same message.

The process P1 is executed by a server, while the process P2 is executed by a mobile electronic device. For instance, the server can be a server which communicates with a low-power wireless link (optionally indirectly) with a mobile electronic device of Internet of things type. Communication between the server and the electronic device therefore uses minimal bandwidth, and the messages exchanged between the server and the mobile electronic device can be daily.

A complete counter message has been stored previously in the server. This counter can be similar to the counter CT such as described in reference to FIG. 1. In the process P1, a new message will be sent; as a consequence step A201 is performed in which a new value is determined for the counter by incrementing its value. At step A201, the counter therefore takes as a value its former value to which the value 1 is added.

If the value associated with said lowest-weight bits of the counter of the server is strictly less than 1024, the 22 heaviest-weight bits do not have to be modified during incrementation.

Step A202 for generating a key can be performed with the counter. Generation of the key uses the counter, information specific to the electronic device (for example the identifier of a secure element present within the electronic device or else the base vector for the authentication aspects (called seed) and well known to the skilled person)) which is intended to receive the message, and a master key which can be shared between the mobile electronic device and the server.

Generation of the key can make use of cryptographic algorithms such as the algorithm AES 128 (well known to the skilled person). Other algorithms can also be used.

At step A203, an indicator element is formulated which here is a portion of the counter determined at step A201. In the embodiment illustrated, the 10 lowest-weight bits of the counter formulated at step A201 will be retrieved, resulting in a portion such as the portion CT0 described in reference to FIG. 1.

The disclosure is naturally not limited to indicator elements using 10 bits, so the skilled person could adapt the number of bits as a function of the application. Similarly, the total number of bits making up the value of the counter can be different by 32 bits (purely illustrative value).

Step A204 can then be performed in which data to be sent are encrypted by using the key which was formulated in step A202. Encryption of the data can use a cryptographic algorithm such as for example the algorithm AES 128, or else the algorithm AES GCM (for 'Advanced Encryption Standard Galois/Counter Mode').

Step A205 can then be performed in which a message is formulated in a structure such as the one described in FIG. 1 by using the encrypted data of step A204 and the indicator element obtained at step A203. The message can then be sent to the mobile electronic device using a low-power wireless link.

The message is received by the mobile electronic device at step B205, which is the first step of the process P2 for receiving a message. It is evident that a counter value has already been stored in the mobile electronic device. A step for verification of the value of the stored counter (step B206) will be performed to process the received message.

In the following, the number of heavy-weight bits of the counter stored in the mobile electronic device are noted A, and the number of 10 low-weight bits of the counter stored in the mobile electronic device are noted B. The received indicator element in the message which was received at step B205 is noted Y.

In step B206, it is verified whether Y is strictly greater than B, and if Y is strictly greater than B then the value formed by A and Y concatenated as binary is used as counter value (step B207). In fact, if Y is strictly greater than B this means that the received message was formulated after the last message received or sent by the mobile electronic device. The hypothesis is made here that there are message exchanges which have not been processed by the mobile electronic device, whereas they have been on the server side (typically as to whether they have been sent but not received).

If Y is less than or equal to B, A+1 and Y concatenated together as binary are used as a counter value (step B208). Here, the value of the lowest-weight bits of Y, that is, in the server, has exceeded 1024, though this was not the case in the counter stored in the mobile electronic device.

At step B209, the new value of the counter formulated at step B207 or B208 is registered, as per the specific case in the mobile electronic device, or more precisely in a non-volatile memory of the mobile electronic device.

At step B210, generation of a key is carried out similarly to step A202 described above; here, information specific to the mobile electronic device is used (for example the identifier of the secure element or else the base vector for the authentication aspects (called seed) and well known to the skilled person) stored in a secure element of the mobile electronic device. Secure element means an electronic device ensuring a secure enclave governed for example under the requirements of specifications of the GlobalPlatform grouping (for example the document 'GlobalPlatform Technology Card Specification' in its version 2.3.1) and/or which can also respond to the requirements of the standard ISO7816 or to common standard criteria.

At step B211, decryption of the encrypted data is carried out. This decryption of encrypted data uses the key formulated at step B210.

Next, step B212 is performed in which it is verified whether decryption has delivered the plaintext encrypted decrypted data. The skilled person can determine whether the data are plaintext, for example by verifying whether an expected command is present in the plaintext data or if the result obtained corresponds to an exploitable or expected data format.

Obtaining something other than the plaintext encrypted decrypted data can be associated with a value counter which is incorrect. A loop is then put in place.

This loop first of all comprises an exit test (step B213) in which it is verified whether the number of iterations has reached a threshold number of iterations. In fact, if the message has been received with a value Y completely disallowing decryption to be carried out, all or some of the possible values with the 10 lowest-weight bits of the counter to be verified can be tested. These 10 bits therefore give the maximal value of the threshold number of iterations, and therefore here there are 1024 potential values which can be taken by the 10 lowest-weight bits of the counter.

If the threshold number of iterations has been reached, this can result in scheduling an update of the value of the saved counter within the electronic device and/or the server and/or reinitialising of the counter value. This can also result in updating the base authentication vector. Finally, this can result in generation of a signal or of an error message. At this stage, the process can be terminated and the plaintext data have not been obtained. It is not possible to process them at a later point, for example.

If however the threshold number of iterations has not been reached, then step B214 can be performed in which the value of Y is modified so that its new value is equal to Y+1.

FIG. 4 illustrates a process for sending a message P3 which differs from the process P1 described in FIG. 2 in that it is executed by the mobile electronic device. This process comprises steps B301 to B305 which are similar to steps A201 to A205 of the process P1. FIG. 4 also shows a process for receiving a message P4 which is similar to the process for processing a message of a message P2 described in FIG. 3, except that it is executed by a server. The process P4 comprises steps A305 to A314 which are similar to steps B205 to B214 described above.

FIG. 5 shows an electronic device 400 which can be a server or a mobile electronic device such as described in FIGS. 3 and 4.

An electronic device 400 comprises a processor 401 and communication means 402 which let it receive messages, for example messages such as the one described in FIG. 1. The processor 401 is capable of executing computer program instructions which are stored in a non-volatile memory 403 of the electronic device 400. The non-volatile memory 403 comprises a set of instructions forming a computer program, this set of instructions comprising an instruction 404, an instruction 405, an instruction 406, and an instruction 407. With the processor 401 the instruction 404 processes the receipt of a message and forms a module for receiving a message. With the processor 401 the instruction 405 forms a module for generating a complete indicator from data stored in the electronic device 400 and from an indicator received in a message. With the processor 401 the instruction 406 forms a module for generating a key from the complete indicator. With the processor 401 the instruction 407 forms a module for decrypting data which are received in a message by using the key.

FIG. 6 illustrates an electronic device 500 which can be a server or a mobile electronic device such as described in FIGS. 3 and 4. The electronic device 500 is configured for sending messages. This electrical device can also be configured for receiving messages and can comprise the same modules as the electronic device 400 such as described in FIG. 5. The electronic device 500 comprises in particular a processor 501 and a module for sending a message 502. The processor 501 is capable of executing instructions contained in a volatile memory 503. The non-volatile memory 503 contains computer program instructions 504 to 508. With the processor 501 the instructions 504 form a determination module of a complete indicator. With the processor 501 the instruction 505 forms a module for generating a key from the complete indicator. With the processor 501 the instruction 506 forms a module for generating an indicator element from the complete indicator. With the processor 501 the instruction 507 forms a data encryption module using the key to obtain encrypted data. With the processor 501 the instruction 508 forms a module for generating the message to be sent, this message to be sent comprising the indicator element and the encrypted data.

The embodiments and implementations described above create secure communication between mobile electronic devices and a server. These embodiments and implementations apply especially to the Internet of things and improve the security of exchanges without taking up more bandwidth.

The invention claimed is:

1. A process for receiving a message executed by an electronic device, the message comprising encrypted data and at least one indicator element, the process comprising:
   generating a complete indicator from data stored in the electronic device and from the received indicator element,
   generating a key from at least the complete indicator,
   decrypting said encrypted data using said key, wherein the complete indicator is a counter of sent and received messages which can be registered on M+N bits, M and N being non-zero integers,
   the received indicator element being a number of N consecutive bits,
   the stored data comprising at least one number of M consecutive bits,
   the elaboration of the complete indicator comprising a binary concatenation of said number of M consecutive bits with said number of N consecutive bits, said number of N consecutive bits forming the low-weight bits of the complete indicator.

2. The process according to claim 1, wherein said received indicator element is in an unencrypted portion of the message.

3. The process according to claim 1, wherein said received indicator element is in an unencrypted header of the received message.

4. The process according to claim 1, wherein if the decryption does not deliver the encrypted decrypted plain-text data, the process further comprises:
   determining another indicator element value selected from a group of predetermined indicator element values is determined, and
   using this selected value to generate the complete indicator.

5. The process according to claim 4, wherein the group of predetermined indicator element values comprises the possible $2^N-1$ values which can be written to N bits.

6. The process according to claim 1, wherein the stored data comprise said number of M consecutive bits, indicating a value A, and a number of N consecutive bits, indicating a value B,
   said number of N consecutive bits of the received indicator element indicating a value Y,
   and in which if Y is strictly greater than B then the elaboration of the complete indicator comprises the binary concatenation of A and Y and the storing of the resulting complete indicator,
   if not, the elaboration of the complete indicator comprises the concatenation of A+1 and of Y.

7. The process according to claim 6, wherein the resulting complete indicator is stored as new stored data, the previous stored data being replaced by the resulting indicator.

8. The process according to claim 1, comprising receiving said message via a low-power wireless link.

9. A process for sending a message executed by an electronic device, the process comprising:
   determining a complete indicator,
   generating a key from at least the complete indicator,
   generating an indicator element from the complete indicator,
   encrypting data using said key to obtain encrypted data, wherein the message to be sent comprises said indicator element and said encrypted data, and wherein the complete indicator is a counter of sent and received messages which can be registered on M+N bits, M and N being non-zero integers, the complete indicator comprising, in the form of binary concatenation, a number of M consecutive bits and a number of N consecutive bits, said number of N consecutive bits forming the low-weight bits of the complete indicator and said indicator element.

10. The process according to claim 9, wherein said indicator element is placed in an unencrypted portion of the message to be sent.

11. The process according to claim 9, wherein determining the complete indicator comprises updating a complete indicator stored in the electronic device.

12. The process according claim 9, wherein the message is sent by a low-power wireless link.

13. An electronic device comprising:
a processor configured for
receiving a message comprising encrypted data and at least one indicator element,
generating a complete indicator from data stored in the electronic device and from the received indicator element,
generating a key from at least the complete indicator,
decrypting said encrypted data using said key, and
wherein the complete indicator is a counter of sent and received messages which can be registered on M+N bits, M and N being non-zero integers,
the received indicator element being a number of N consecutive bits,
the stored data comprising at least one number of M consecutive bits,
the elaboration of the complete indicator comprising a binary concatenation of said number of M consecutive bits with said number of N consecutive bits, said number of N consecutive bits forming the low-weight bits of the complete indicator.

14. The electronic device according to claim 13, comprising a server or a mobile electronic device.

15. An electronic system comprising:
a processor configured for:
determining a complete indicator,
generating a key from at least the complete indicator,
generating an indicator element from the complete indicator,
encrypting data using said key to obtain encrypted data,
generating the message to be sent, the message to be sent comprising said indicator element and said encrypted data,
sending the message to be sent,
wherein the complete indicator is a counter of sent and received messages which can be registered on M+N bits, M and N being non-zero integers,
the complete indicator comprising, in the form of binary concatenation, a number of M consecutive bits and a number of N consecutive bits, said number of N consecutive bits forming the low-weight bits of the complete indicator and said indicator element.

16. The system according to claim 15, comprising a server and/or a mobile electronic device.

* * * * *